(12) United States Patent
Viswanathan (10) Patent No.: US 10,110,502 B1
(45) Date of Patent: Oct. 23, 2018

(54) AUTONOMOUS HOST DEPLOYMENT IN MANAGED DEPLOYMENT SYSTEMS

(71) Applicant: Amazon Technologies, Inc., Seattle, WA (US)

(72) Inventor: Ganesh Viswanathan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 559 days.

(21) Appl. No.: 14/611,961

(22) Filed: Feb. 2, 2015

(51) Int. Cl.
*G06F 15/173* (2006.01)
*H04L 12/911* (2013.01)

(52) U.S. Cl.
CPC .................................... *H04L 47/70* (2013.01)

(58) Field of Classification Search
USPC .................................. 709/213, 226; 713/167
See application file for complete search history.

(56) References Cited

U.S. PATENT DOCUMENTS

| | | | | |
|---|---|---|---|---|
| 5,978,593 | A * | 11/1999 | Sexton ................. | G05B 19/054 710/1 |
| 6,253,125 | B1 * | 6/2001 | Barker .................. | B64G 1/288 244/158.1 |
| 8,150,948 | B2 | 4/2012 | Andrews et al. | |
| 8,756,595 | B2 | 6/2014 | Arcilla et al. | |
| 9,300,728 | B1 * | 3/2016 | Ananchaperumal | .... H04L 67/10 |
| 2003/0097422 | A1 | 5/2003 | Richards et al. | |
| 2006/0048145 | A1 | 3/2006 | Celli et al. | |
| 2007/0192597 | A1 * | 8/2007 | Bade ....................... | G06F 21/57 713/167 |
| 2009/0210751 | A1 * | 8/2009 | Cabezas ............... | G06F 11/2221 714/43 |
| 2011/0179177 | A1 * | 7/2011 | Alcorn ................. | G06F 9/5061 709/226 |
| 2013/0086212 | A1 | 4/2013 | MacInnis | |
| 2013/0151595 | A1 | 6/2013 | Fernandez-Ruiz et al. | |
| 2014/0297609 | A1 * | 10/2014 | Larson ................ | G06F 11/1471 707/695 |
| 2016/0335088 | A1 * | 11/2016 | Scalabrino .......... | G06F 9/30098 |
| 2016/0350114 | A1 * | 12/2016 | Airaud ................... | G06F 9/384 |
| 2016/0350115 | A1 * | 12/2016 | Tonnerre ............... | G06F 9/3016 |

* cited by examiner

Primary Examiner — Tammy Nguyen
(74) *Attorney, Agent, or Firm* — Robert C. Kowert; Meyertons, Hood, Kivlin, Kowert & Goetzel, P.C.

(57) ABSTRACT

Autonomous host deployment may be implemented in managed deployment environments in order to deploy resources at resource host(s) when a deployment authority is unavailable. Upon startup of a resource host, a determination may be made as to whether a remote deployment state authority is available. If the deployment state authority is unavailable, a deployment state for a resource host and/or resources hosted at a resource host may be identified. Different resources at a resource host and the resource host itself may have different deployment states identified. In some embodiments, deployment state information may be locally maintained and accessed to determine the deployment state. The resource host may perform operations to deploy the resource host and/or resources according to the identified deployment state.

20 Claims, 8 Drawing Sheets

AUTONOMOUS HOST DEPLOYMENT IN MANAGED DEPLOYMENT SYSTEMS

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible may manage the deployment of virtual resources onto physical resource hosts so that physical resources may be effectively utilized. However, as the size and complexity of devices, resources, and environments change and grow, deployment becomes increasingly complex. Managing deployment across different physical resources may result in deployment dependencies, for instance, which can cause failures when some resources or services utilized in the deployment fail or become unavailable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement autonomous resource deployment in managed deployment systems. Distributed systems may utilize large numbers of physical resources, such as servers, computing nodes or other computing systems (e.g., computing system 1000 described below in FIG. 8) to provide different services, applications, and/or functionalities. In order to deploy resources onto the appropriate physical resources that host the resources (i.e. resource hosts), various configuration operations may need to be performed. For example, the appropriate software version or configuration may need to be downloaded, installed, and configured on the resource host. Various validation and other operations to register the resources may need to be performed. With all of the different variables and configuration options which may need to be successfully navigated when deploying resources, centralized or managed deployment of resources can provide an efficient way to manage resource deployment. Moreover, deployment state, such as whether a deployed resource is in active, inactive, standby or other form may be centrally coordinated so that resources across a distributed system may be appropriately distributed.

Typically resource deployment may occur between a deployment manager (or service or other deployment state authority) and the resource hosts themselves over a network. Such distributed environments however, may be prone to certain types of failures or performance characteristics which may impede the progress of deployment activities. For example, network partitions between a deployment manager and resource hosts may prevent communication and management of a deployment at the resource hosts as the correct deployment state for a resource to be deployed may unattainable from the deployment manager. Deployment may thus stall until the failure scenario or system performance changes to allow more communication with the deployment manager. In some instances, deployment manager outages can significantly increase the delay in deploying resources in a distributed system, resulting in a loss of resources that may be utilized to support a service, function, or application provided by a distributed system. Autonomous resource deployment in managed deployment systems, such as the managed deployment system described above, may be performed to retain centralized control over deployment while avoiding failure scenarios that impede forward progress in making resource deployments.

Figure 1:
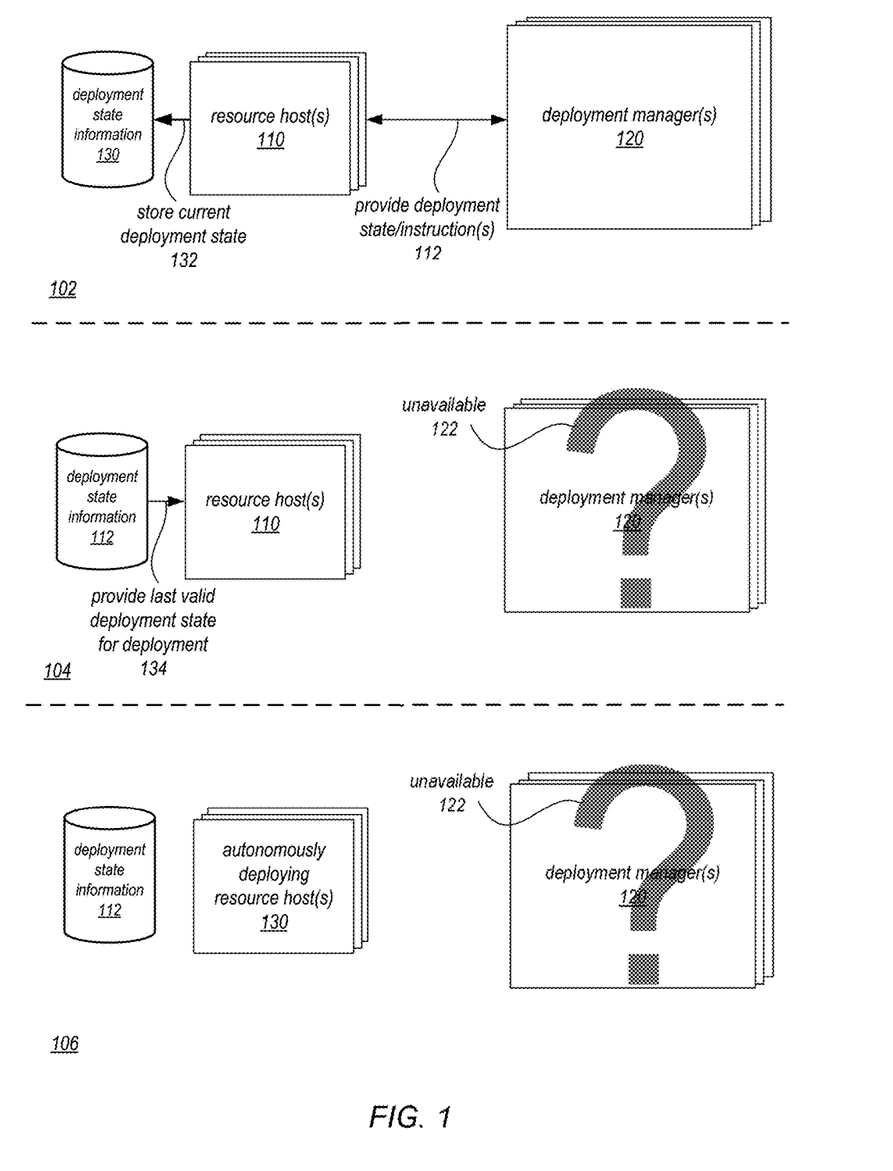
FIG. 1 is a series of block diagrams illustrating autonomous host deployment in managed deployment systems, according to some embodiments.

FIG. 1 is a series of block diagrams illustrating autonomous host deployment in managed deployment systems, according to some embodiments. In scene 102, deployment manager(s) 120 are able to provide deployment state and/or deployment instructions to resource host(s) 110 so that resource host(s) may, in turn, deploy different resources. In various embodiments, resource host(s) 110 may host, maintain, or otherwise implement one or multiple resources for a distributed system. For example, a resource host 110 may host resources that respectively provide virtual computing capacity, data storage, or other computational services. In order to deploy these resources, the provided instructions may include configuration operations to load or install the appropriate software on resource host(s) 110, configure hardware on resource host(s) 110, and/or otherwise prepare resource host(s) 110 to host the resources. Different deployment states may be implemented, in various embodiments, for the different resources. For example, an active state for a resource may indicate that the resource is to be actively used to perform some task, service, application or function for which it was deployed. A standby or inactive state may indicate that the resource is being held in reserve (or awaiting redeployment as another resource) to provide additional capacity if necessary. As various different deployment states may be used, the previous examples are not intended to be limiting.

As illustrated in scene 102, current deployment state may be stored 132 in deployment state information 130. Deployment state information 130 may be respective, local attached storage to a resource host(s) 110, such as one or more directly attached persistent storage devices (e.g., hard disk drives (HDD) or solid state drives (SSD)). Whereas, deployment manager(s) 120 may be reached over a network or some other remote communication protocol or technique (e.g., requests sent according to an application programming interface (API) for deployment manager(s) 120). As deployment state and other information is provided 112 from deployment manager(s) 120, the deployment state information 130 may be stored 132 as well.

As illustrated in scene 104, a failure scenario, or other event may occur that disrupts or prevents communication between resource host(s) 110 and deployment manager(s) 120. For example a power disruption may cause resource hosts 130 to reboot or restart. The restarting resource hosts 130 may need to redeploy resources at the host (e.g., may configure different resources according to a particular deployment state). However, as illustrated in scene 104, deployment manager 120 may still be unavailable 122 as a result of the failure scenario or event. Restarting resource host(s) 110 may autonomously deploy resources without regard to or input from deployment manager 120. For example, a last valid deployment state may be provided 134 or obtained from deployment state information 112 (which may not be affected by the failure scenario). Based on the last valid deployment state 134 (and possibly other information retained in deployment state information 112), restarting resource host(s) 130 may perform configuration operations to deploy the resources according to the deployment state 134. In some embodiments, one resource host 110 may request/receive deployment state information from another one or more resource hosts 110 to identify a deployment state to perform deployment. In at least some embodiments, different deployment states may be maintained for each resource (e.g., resource A is deployed as active, while resource B is deployed as standby). As illustrated in scene 106, autonomously deploying resource host(s) 130 may deploy resources and resume operations before (sometimes long before) deployment manager 120 becomes available. However, although not illustrated, in some embodiments, autonomous resource deployment may be aborted upon detecting deployment manager(s) 120 are available and/or a deployment stated according to which resources are deployed may be synchronized with a deployment state obtained from deployment manager(s) 120.

Please note, FIG. 1 is provided as an example illustration of autonomous resource deployment in managed deployment systems, and is not intended to be limiting as to the physical arrangement, size, or number of components, modules, or devices, implementing autonomous resource deployment in managed deployment systems. For example, in some embodiments, the deployment manager(s) 120 may be implemented as a single system or service (or distributed as part of multiple different services or systems, such as resource management, capacity planning, etc.).

This specification next includes a general description of a provider network, which may implement autonomous resource deployment for resource hosts implementing portions of the provider network. Then various examples of a provider network and deployment service are discussed, including different components/modules, or arrangements of components/module that may be employed as part of implementing a deployment service. A number of different methods and techniques to autonomous resource deployment in managed deployment systems are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
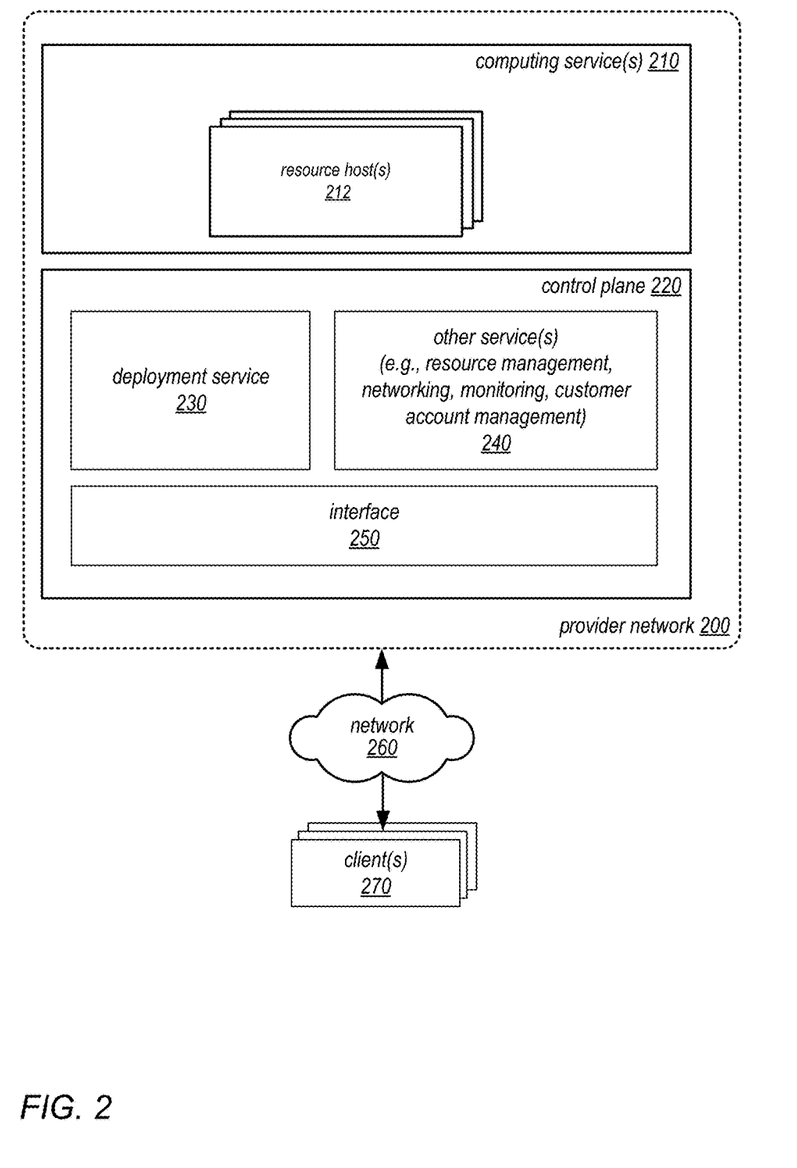
FIG. 2 is a block diagram illustrating a provider network that implements autonomous host deployment in managed deployment systems, according to some embodiments.

FIG. 2 is a block diagram illustrating a provider network that implements autonomous host deployment in managed deployment systems, according to some embodiments. The various components of a provider network illustrated may be implemented on one or more computing devices, such as computing system 1000 in FIG. 8, in one or more hardware and/or software components. Provider network 200 may be set up by an entity such as a company or a public sector organization to provide one or more services (such as various types of cloud-based computing or storage) accessible via the Internet and/or other networks to clients 270. Provider network 200 may include numerous data centers hosting various resource pools, such as collections of physical and/or virtualized computer servers, storage devices, networking equipment and the like, needed to implement and distribute the infrastructure and services offered by the provider network 200.

In some embodiments, provider network 200 may provide computing resources as part of computing service(s) 210. For example, these computing resources may in some embodiments be offered to clients in units called "instances." A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of provider network 200 in different embodiments, including general purpose or special purpose computer servers, storage devices, network devices and the like. Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client 270 applications, without for example requiring the client 270 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Provider network 200 may implement control plane 220 to manage the operation of provider network 200 and computing service(s) 210. Other service(s) 240 may implement various functionalities, such as resource management, network management, monitoring, and customer account management. Control plane 220 may also implement interface 250, which may be a programmatic and/or graphical user interface for client(s) 270 to access computing service(s) 210 and other features provided by control plane 220 (e.g., account control features).

Computing services, like computing service(s) 210 may be implemented utilizing various resources hosted on resource host(s) 212 that have been deployed to perform various tasks as part of the respective computing service. For example, resources deployed on resource host(s) 212 may host one or more of the variously configured instances described, or virtual block-based storage, or other form of data store. In some embodiments, in order to increase or add additional capacity to computing service(s) 210 in order to handle more clients, additional resources may be needed. For example, the deployment state of resources on resource host(s) 212 may be changed from standby to active (which may trigger various operations to deploy the resource as active). In various embodiments, provider network 200 may implement deployment service 230 as part of control plane 220 to deploy resources on resource host(s) 212 to support computing services 210.

Clients 270 may encompass any type of client configurable to submit requests to provider network 200. For example, a given client 270 may include a suitable version of a web browser, or may include a plug-in module or other type of code module configured to execute as an extension to or within an execution environment provided by a web browser. Alternatively, a client 270 may encompass an application such as a database application (or user interface thereof), a media application, an office application or any other application that may make use of compute instances to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 270 may be configured to generate network-based services requests according to a Representational State Transfer (REST)-style network-based services architecture, a document- or message-based network-based services architecture, or another suitable network-based services architecture. In some embodiments, a client 270 (e.g., a computational client) may be configured to provide access to a compute instance 270 in a manner that is transparent to applications implement on the client 270 utilizing computational resources provided by the compute instance.

Clients 270 may convey network-based services requests to provider network 200 via external network 260. In various embodiments, external network 260 may encompass any suitable combination of networking hardware and protocols necessary to establish network-based communications between clients 270 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

Figure 3:
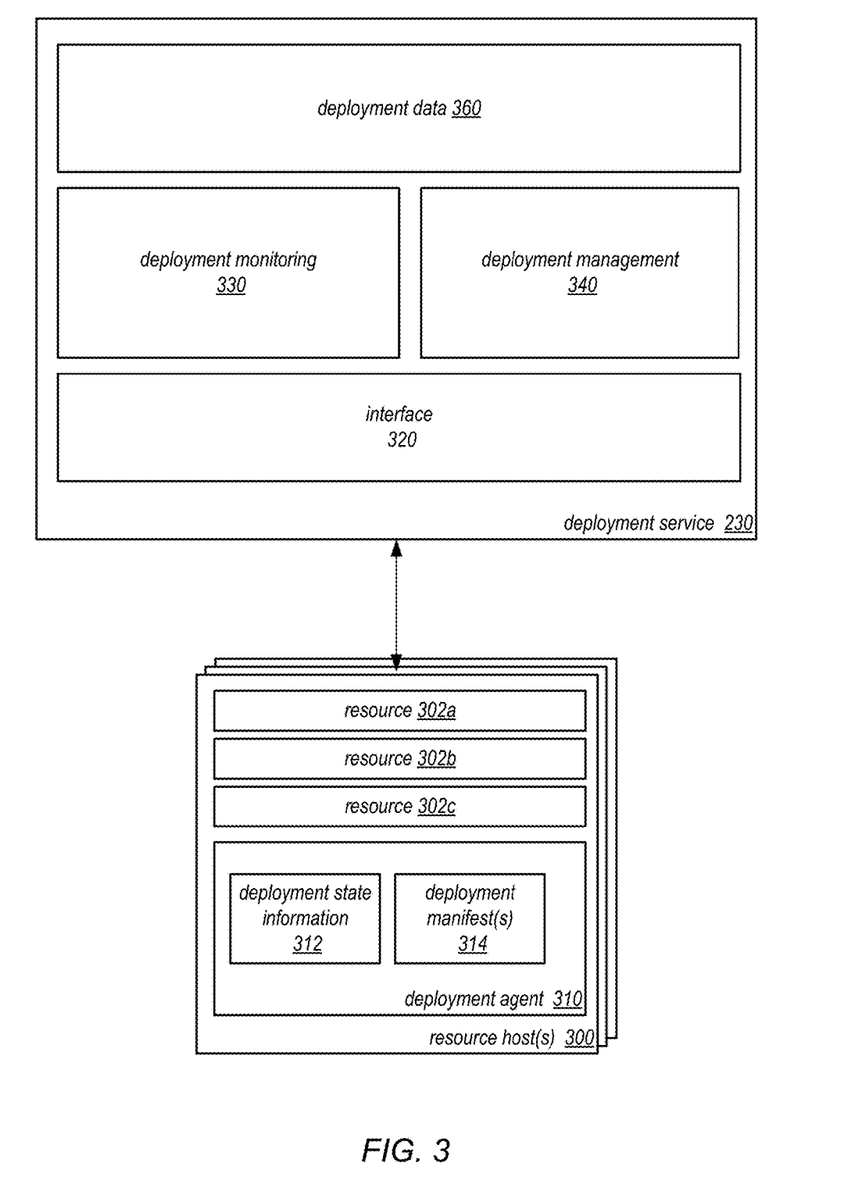
FIG. 3 is a block diagram illustrating a deployment service and deployment agent, according to some embodiments.

FIG. 3 is a block diagram illustrating a deployment service and deployment agent, according to some embodiments. As noted above with regard to FIG. 2, the various components of the deployment service illustrated may be implemented on one or more computing devices, such as computing system 1000 in FIG. 8, in one or more hardware and/or software components. In various embodiments, deployment service 230 may be highly scalable—able to handle extremely large workloads. For example, some or all of the various components discussed below may be implemented by multiple different nodes, systems and/or devices.

However, in some embodiments, the described functionalities may be scalable to fit into a single computing device (e.g., a single server box or node with local attached storage). In this way, deployment service 230 may accommodate data centers, collection of computing resources, or provider networks of any size—from a virtualized collection of resources running on a developer workstation, or a small environment consisting of two racks in the back of a truck, to the multiple interconnected data centers in order to provide deployment of resources on resource hosts located in these varying collections of computing resources.

Figure 4:
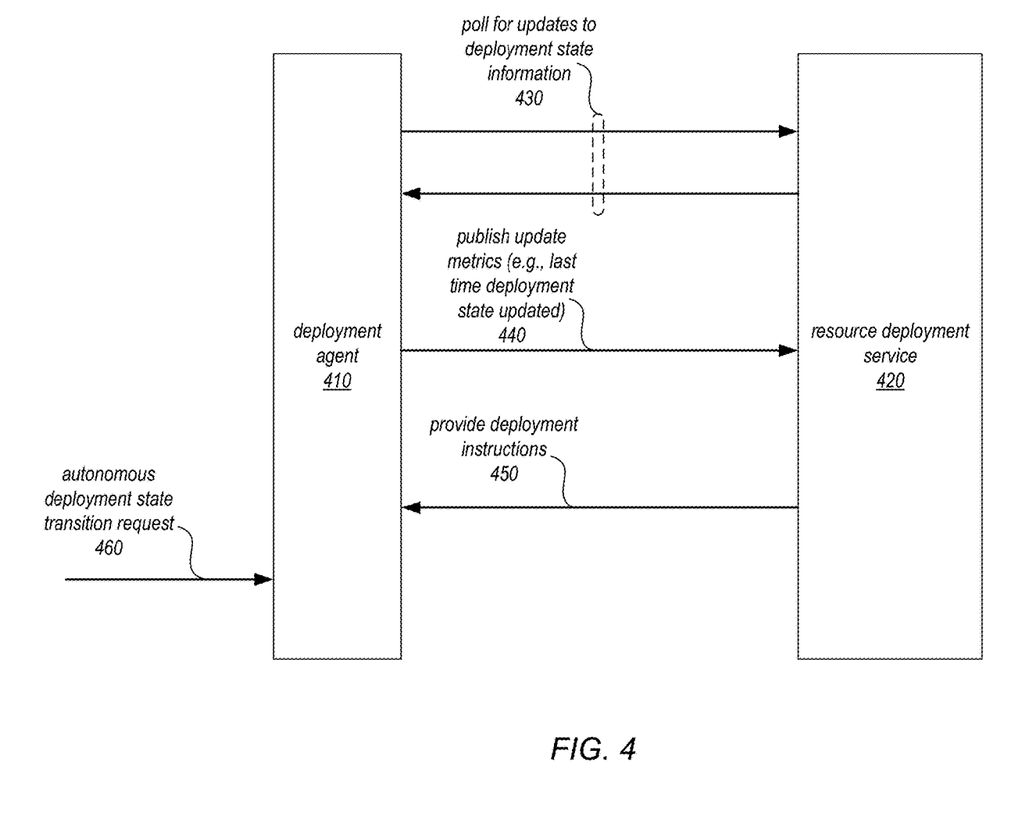
FIG. 4 is a block diagram illustrating interactions between a deployment agent and a deployment service, according to some embodiments.

Resource host(s) 300 may host multiple different resources 302*a*, 302*b*, 302*c*, in some embodiments. These resources may perform different services or functions as part of computing services discussed in FIG. 2. Resource host 300 may in some embodiments implement deployment agent 310. Deployment agent 310 may implement various ones of the techniques described below with regard to FIGS. 5 and 6. For example, as illustrated in FIG. 3, deployment agent may maintain deployment state information 312 to identify deployment state for resources 302 in the event deployment service 230 is unavailable. FIG. 4, discussed below, provides examples of updating deployment state information 312 based on information obtained from deployment service 230. Deployment agent 310 may also maintain deployment manifest(s) 314 (or other information) which may describe the various operations to configure resources 320 as part of deployment on resource host 300. For example, deployment manifest(s) 314 may describe different builds or other configurations for an application, component, or piece of hardware and/or software for resource 302*a*, such as a particular version of software application, for different deployment states (e.g., active, standby, inactive, etc. . . . ).

Deployment service 230 may manage and/or otherwise direct the deployment of resources, such as resources 302, across resource host(s) 300. For example, deployment service 230 may respond to utilization and/or other demand information for provider network services, trigger the deployment of new resources or change in deployment state for existing resources. Deployment service may intelligently select appropriate resource host(s) 300 according to various deployment rules, criteria, priorities, and/or other information. In some embodiments, deployment service 230 may implement interface 320, which may be a programmatic (e.g., an application programming interface (API)) and/or graphical user interface via which other systems or devices, such as deployment agent 310, resource host 300, and other control plane services 240 may communicate with deployment service. For example deployment agents 310, may request deployment state or other deployment information, reporting update metrics and/or perform various other interactions via interface 320 with deployment service 230 (e.g., synchronize deployment state for autonomously deploying resource host(s) 300).

Deployment service 230 may implement deployment monitoring, which may performing the various techniques discussed below with regard to FIG. 3, in some embodiments. For example, resource hosts that lag behind in updating state information may be identified, and responsive action may be directed by deployment monitoring 330 (e.g., generating a troubleshooting ticket). In some embodiments, responsive actions may include deployment service 230 proactively re-deploying resources on identified hosts, or sending deployment state information to identified hosts. Deployment monitoring may manage and/or handle various deployment metrics, and other information, such as deployment performance information from deployment agents.

Deployment service 230 may implement deployment management 340 which may provide the various deployment state and instructions to deployment agent 310 to perform deployments. For example, deployment management 340 may identify particular software applications, hardware configurations, and other information to utilize when configuring a resource host 300 to deploy a resource at a particular deployment state. Management of deployment state may be performed, determining when changes to deployment state for a particular resource may be needed (e.g., switching from active to inactive or standby). Various capacity planning and other resource inputs, such as service workload monitoring service may be utilized to make deployment decisions at deployment management 340.

Deployment service 230 may implement a deployment data layer 360, which may provide persistent storage for various data including, but not limited to, build manifests(s), deployment state, metrics, and other diagnostic(s), and other resource data. For example, deployment data 360 may implement an extensive inventory management database for tracking deployment state for resources, mapping information between resources and resource hosts, and/or any other data related to deployment. Deployment data 360 may, in some embodiments, serve as a repository for software, hardware configurations, and other information that may need to be copied, loaded, or otherwise provided to resource hosts as a part of deployment. Deployment data 360 360 may utilize local storage, such as a local database or storage cluster, a specially configured or reserved storage system, or may utilize a storage service of provider network 200, in some embodiments.

FIG. 4 is a block diagram illustrating interactions between a deployment agent and a deployment service, according to some embodiments. As discussed above, and below with regard to FIG. 6, deployment agent 410 may poll resource deployment service 420 for updates to deployment state information 430. Requests for deployment state information may be periodically, or aperiodically sent, to retrieve deployment state information. If deployment state information has changed, then local deployment state information to the deployment agent 410 may be updated. In this way, a valid (or likely valid) deployment state may be identified in the event autonomous deployment is performed by deployment agent 410.

As updates are received and applied, deployment agent 410 may publish update metrics 440 to resource deployment service for use in various monitoring activities, as discussed above. Resource deployment service may, in some embodiments, provide deployment instructions 450 to deployment agent 450 to perform deployment. Alternatively, autonomous deployment state transition requests 460 may be received which request the performance of autonomous deployment according to a particular deployment state, in some embodiments. Please note that the previous examples of interactions between a deployment agent are not intended to imply a particular sequence or ordering of messages or communications. Nor do these examples illustrate all possible interactions or communications. Thus, the previous examples are not intended to be limiting.

Figure 5:
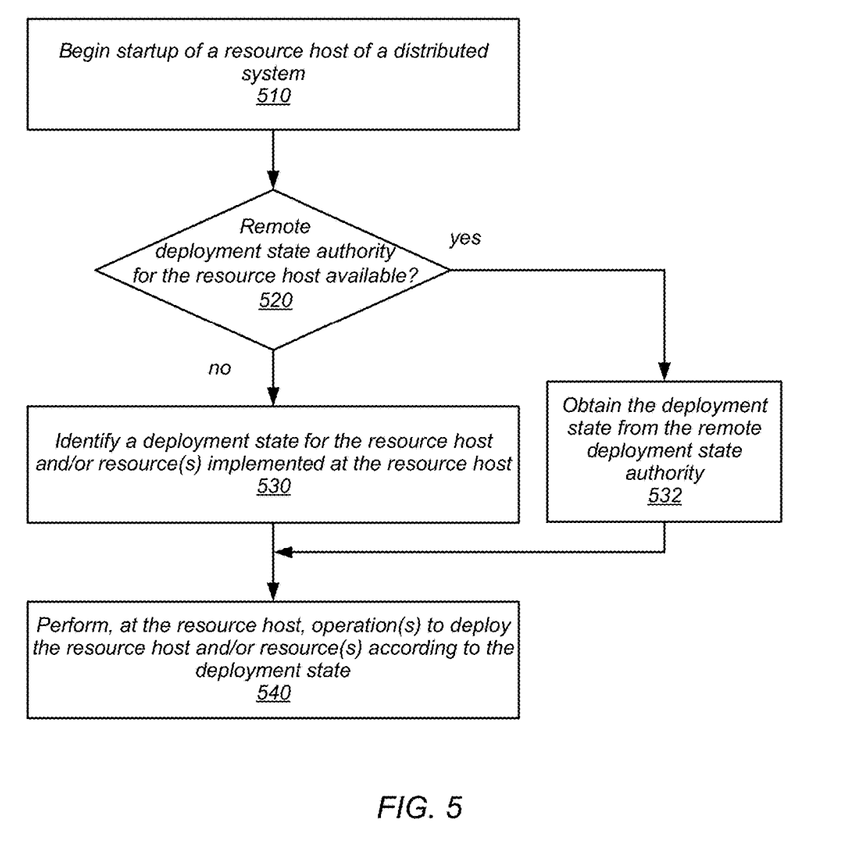
FIG. 5 is high-level flowchart illustrating various methods and techniques for autonomous host deployment in managed deployment systems, according to some embodiments.

The examples of implementing autonomous resource deployment discussed above with regard to FIGS. 2 through 4 have been given in regard to virtual computing resources offered by a provider network. Various other types or configurations of systems or services may implement these techniques. For example, in some embodiments, a deployment engine and/or service may be implemented in a single computing device to deploy computing resources. Moreover, the tasks, location, or environment for which resources are deployed (e.g., rack, room, data center, fault tolerance zone, service, application, or function) may vary. FIG. 5 is high-level flowchart illustrating various methods and techniques for autonomous host deployment in managed deployment systems, according to some embodiments. These techniques may be implemented using various components or nodes of a system as described above, or other systems or devices.

A deployment state authority (e.g., deployment manager(s) 120 in FIG. 1 or deployment service 230 in FIGS. 2-4) may provide a centralized, coordinated, or managed approached to direct the deployment of resources at resource hosts in a distributed system. Resources may be deployed to perform a variety of different services, tasks, functions, and/or applications at resource hosts for a distributed system. While resources may continue as currently deployed even if a deployment state authority remote from a resource host (e.g., via a network connection) becomes unavailable, some failure scenarios may cause a resource host to redeploy. For example, as indicated at 510, a resource host of a distributed system may begin startup (or restart) due to a power loss or other system failure, which may necessitate deployment of resources at the resource host. As indicated at 520, a resource host may first determine whether a remote deployment state authority is available. For example, a ping request or a request for deployment state and other information may be sent. This request may be sent to an intermediary service or system (e.g., an interface for a computing service which manages the particular resource host) or may be sent directly to a remote deployment authority. If no response is received to one or more multiple requests (and in some cases a timeout window has passed), it may be determined that the remote deployment state authority is unavailable, as indicated by the negative exit from 520.

As indicated at 530, in response to determining that the deployment state authority is unavailable, a deployment state for the resource host (and/or for resource(s) implemented at the resource host) 530 may be identified. In at least some embodiments, the resource host deployment state may be the same or different than resources deployed at the resource host. For example, the resource host may be deployed as "Active," while one or more resources deployed at the resource host may have deployment states of "Standby." In some embodiments, a resource host may not yet have any resources deployed, and thus may be deployed according to a deployment state without hosting any resources. In at least some embodiments, different deployment states may be identified for different resources, allowing for fine-grained deployment of resources at a resource host. As discussed above, persistently maintained deployment state information may be accessed and evaluated to determine a last valid deployment state, in some embodiments. For example, a local or directly attached storage device to a resource host (e.g., a server) may maintain deployment state information for resources implemented at the attached host. The storage device may be accessed and the deployment state used to identify the deployment state for resources. In some embodiments, other resource hosts, with which the resource host may communicate, may store deployment state information for the resource host. The resource host may obtain this information from one or multiple ones of the other resource hosts (e.g., according to a quorum decision). In some embodiments, a time stamp indicating the currency of the other hosts data may be utilized to determine which information is most current. In some embodiments, a deployment state may be specified for a resource host (and/or resources deployed at the resource host) in a request to perform autonomous resource deployment at the resource host. Thus, identifying the deployment state may be performed by parsing the autonomous deployment request. Please note that in some embodiments, the autonomous resource deployment request may be received for a resource that is deployed at a resource host that is not restarting, in response to which the resource may be redeployed according to the request in autonomous fashion.

As indicated at 540, operation(s) to deploy the resource host and/or resource(s) according to the identified deployment state may be performed, in various embodiments. For example, a manifest or other information locally accessible to a host (e.g., in local or directly attached persistent storage) may be evaluated to indicate which operations to perform (e.g., types of validation, types of software build or hardware configuration, registration operations, acceptance or testing operations, etc. . . . ). During the performance of the operations to deploy the resource host and/or resources, periodic or aperiodic checks may be performed to determine whether the remote deployment state authority is available again, in some embodiments. If determined to be available, deployment state may be obtained and operations performed to synchronize the deployment of resources at the resource host according to the deployment state obtained from the remote deployment state authority. For instance, if the deployment state is the same, then no change in the operations being performed may occur. However, if there is a difference in identified state, at element 530, and obtained state from the remote deployment state authority, then the current operations may be aborted, the effects of the current operations may be undone, and/or different operations may be performed instead. In this way, the deployment state of resources deployed at the resource host may be consistent with the deployment state identified for the resources at the remote deployment state authority.

As indicated by the positive exit from 520, if the deployment state authority is available, then the deployment state and/or deployment instructions may be obtained from the authority, as indicated at 532. Then the operations may be performed to deploy the resource(s) according to the information obtained from the authority.

Figure 6:
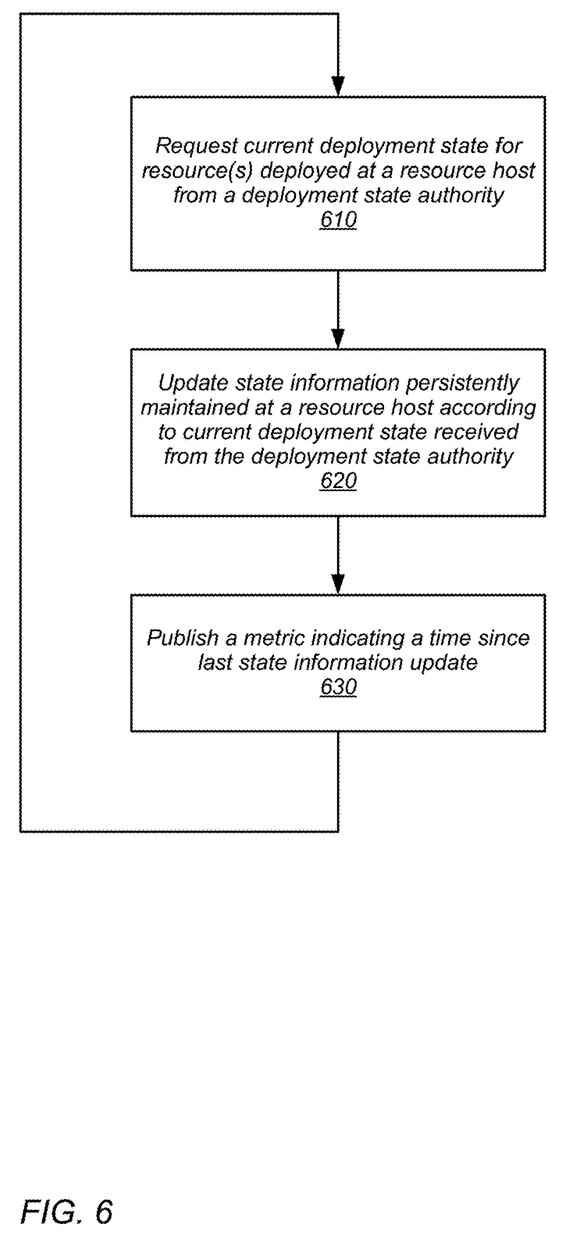
FIG. 6 is a high-level flowchart illustrating various methods and techniques for polling a deployment state authority for current deployment state information for a resource host, according to some embodiments.

FIG. 6 is a high-level flowchart illustrating various methods and techniques for polling a deployment state authority for current deployment state information for a resource host, according to some embodiments. As discussed above with regard to FIG. 5, in at least some embodiments, deployment state information may be persistently maintained for identifying a deployment state according to which configuration operations may be performed. For instance, in some embodiments a polling technique may be implemented which periodically, or aperiodically, obtains current deployment state information. For example, as indicated at 610, current deployment state for resource(s) deployed at a resource house may be requested from a deployment state authority, in some embodiments. As discussed previously with regard to FIG. 4, this request may be made via a particular API call to a deployment authority remote from the resource host, such as deployment service or manager. These requests may be made with sufficient frequency to satisfy certain lag thresholds, in some embodiments, as discussed below with regard to FIG. 7. State information persistently maintained at a resource host may be updated according to current deployment state (and other information) received from the deployment state authority, as indicated at 620. Updating state information may include various metadata about the updates, such as timestamp.

As indicated at 630, an example metric indicating a time since last state information update may be published, in various embodiments. For example, a metric may be generated and sent every time state information is updated, such as at 620. However, in some embodiments, publishing metrics may be performed differently. In some embodiments, the metrics may be requested by a monitoring agent or service, such as discussed above with regard to FIG. 3. Metrics may also include other information, such as diagnostic or deployment performance information (e.g., logs, histories, etc. . . . ).

Figure 7:
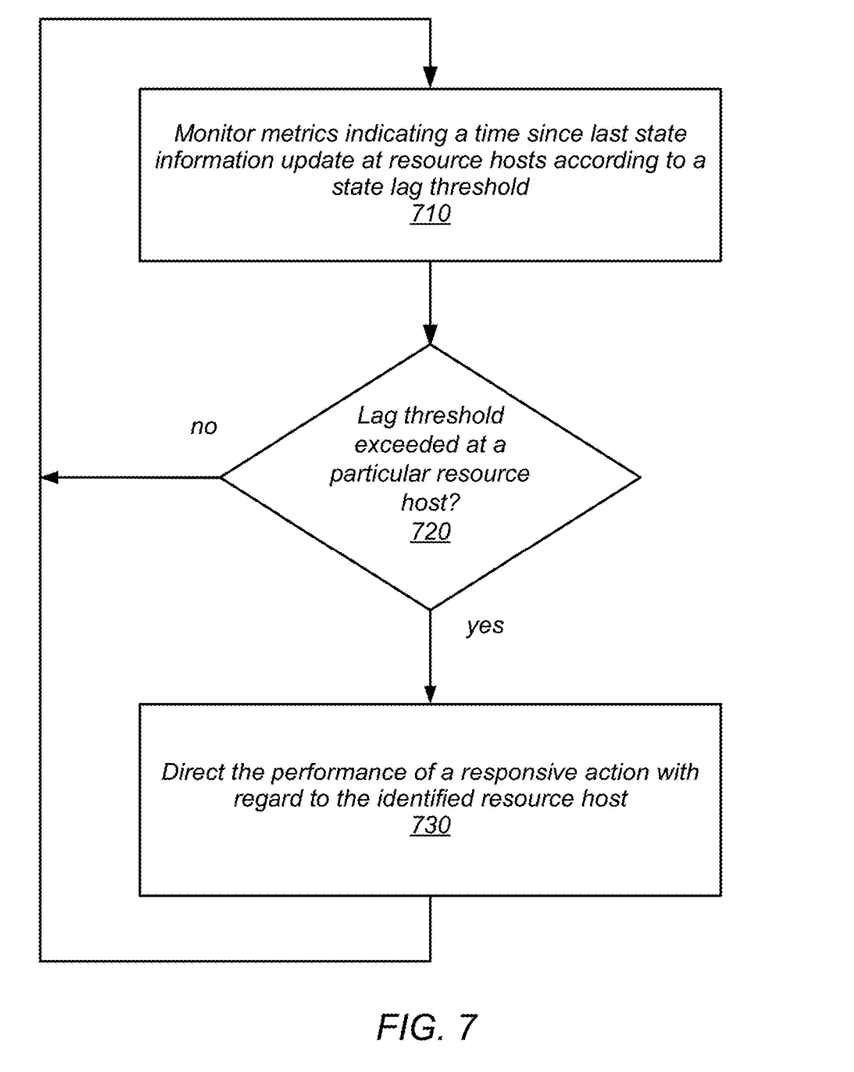
FIG. 7 is a high-level flowchart illustrating various methods and techniques for monitoring state information updates to resource hosts, according to some embodiments.

FIG. 7 is a high-level flowchart illustrating various methods and techniques for monitoring state information updates to resource hosts, according to some embodiments. As indicated at 710, metrics indicating a time since last state information update at resource hosts may be monitored according to a lag threshold. For example, a 10 minute lag threshold may be implemented. If a resource host has not reported an update to state information for longer than 10 minutes, then the lag threshold may be exceeded for the particular resource host, as indicated by the positive exit from 730. As indicated at 730, in various embodiments the performance of a responsive action with regard to the identified resource host may be directed. For example, a notification, such as work request or troubleshooting ticket may be generated and communicated to technicians or other agents responsible for investigating possible resource host failures. In some embodiments, the resource host may be place on a list of resources that are more closely monitored. In some embodiments, a deployment authority, such as a deployment manager or service, may change the deployment state for various resources implemented at the identified resource host. In this way, resource hosts which may not autonomously recover into a valid deployment state may be identified and corrected prior to an occasion when the resource host would need to perform autonomous deployment. Please note that the previous example of a lag threshold may be applied many other metrics and or trigger conditions or events for resource deployment.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
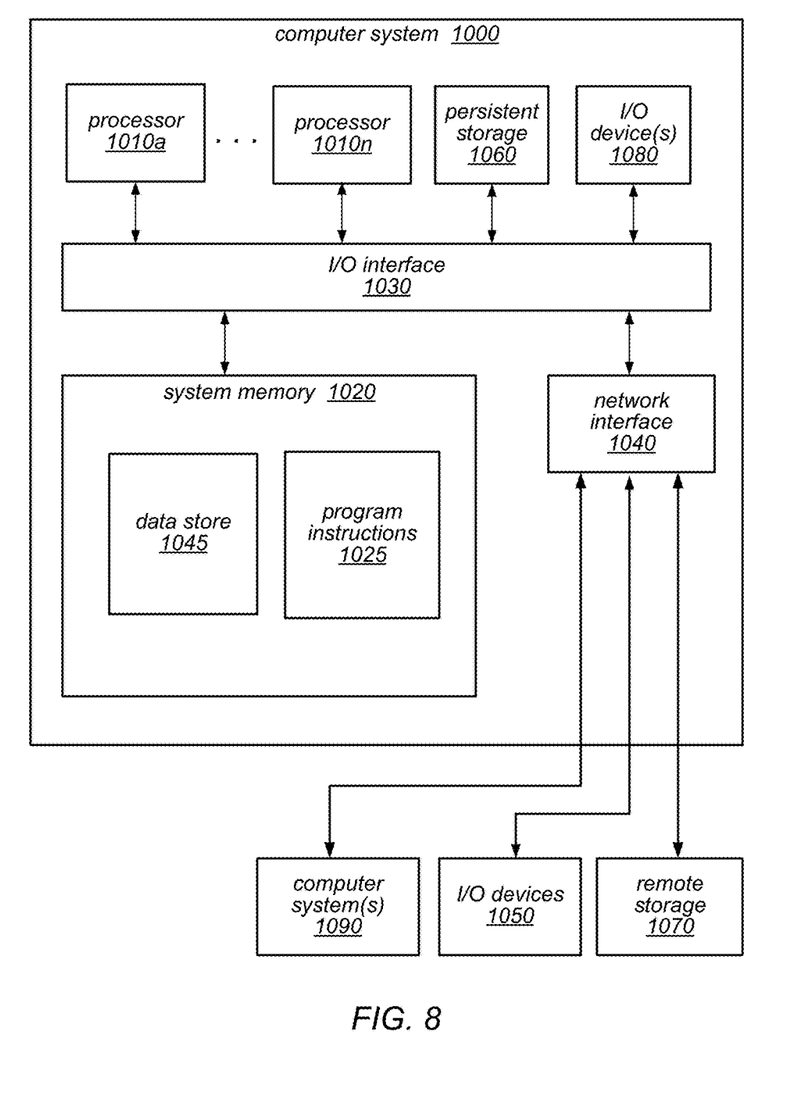
FIG. 8 is a block diagram illustrating an example computing system, according to some embodiments.

Embodiments of autonomous resource deployment in managed deployment systems as described herein may be executed on one or more computer systems, which may interact with various other devices. FIG. 8 is a block diagram illustrating an example computer system, according to various embodiments. For example, computer system 1000 may be configured to implement one or more nodes of a compute cluster that implements the provisioning engine or service described above, the network-based services, such as a computing service or storage service, and/or clients or other systems or devices described above, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the data warehouse system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a diagnostic agent, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A distributed system, comprising:
   one or more compute nodes that implement a resource deployment manager, configured to provide a current deployment state for resources deployed in the distributed system;
   a plurality of resource hosts, respectively implementing a deployment agent;
   the deployment agent, configured to:
      upon startup of the resource host:
         determine that the resource deployment manager is unavailable;
         access persistently maintained state information comprising a last valid deployment state received from the resource deployment manager for one or more resources deployed at the resource host; and
         perform one or more operations to deploy the one or more resources according to the last valid deployment state;
      request the current deployment state for the one or more resources deployed at the resource host from the resource deployment manager; and
      update the state information to include the current deployment state received from the resource deployment manager.

2. The system of claim 1, wherein to access the persistently maintained state information, the deployment agent is further configured to:
   obtain the persistently maintained state information from one or more other resource hosts of the plurality of resource hosts.

3. The system of claim 1,
   wherein the deployment agent is further configured to publish a metric indicating a time since last state information update;
   wherein the resource deployment manager is configured to:
      monitor the respective metrics indicating the time since last state information update published from the respective deployment agents of the plurality of resource hosts with respect to a state lag threshold;
      based, at least in part, on the monitor of the respective metrics, identify a resource host of the plurality of resource hosts that exceeds the state lag threshold; and
      direct a responsive action with respect to the identified resource host.

4. The system of claim 1, wherein the distributed system is implemented as part of a provider network, and wherein the plurality of resource hosts implement one or more network-based services offered via the provider network.

5. A method, comprising:
   performing, by one or more computing devices:
      upon startup of a resource host of a distributed system:
         determining that a remote deployment state authority for the resource host is unavailable, wherein the remote deployment state authority provides current deployment state for resource hosts deployed in the distributed system;
         identifying a deployment state for the resource host;
         performing, at the resource host, one or more operations to deploy the resource host according to the identified deployment state;
      requesting the current deployment state for the resource host from the remote deployment state authority; and
      updating the state information to include the current deployment state received from the remote deployment state authority.

6. The method of claim 5, wherein identifying the deployment state for the resource host comprises accessing persistently maintained state information at the resource host comprising a last valid deployment state received from the remote deployment state authority for the resource host.

7. The method of claim 6, wherein the persistently maintained state information is obtained from a storage device locally attached to the resource host.

8. The method of claim 6,
   wherein the one or more computing devices implement a deployment agent at the resource host, wherein the resource host is one of a plurality of resource hosts of the distributed system implementing respective deployment agents, wherein the respective deployment agents of the plurality of different resources hosts perform the requesting and the updating;
   wherein the method further comprises:
      performing, by one or more computing devices implementing the deployment state authority:
         monitoring respective metrics indicating the time since last state information update received from the respective deployment agents of the plurality of resource hosts with respect to a state lag threshold;
         based, at least in part, on the monitoring of the respective metrics, identifying a resource host of the plurality of resource hosts that exceeds the state lag threshold; and
         directing a responsive action with respect to the identified resource host.

9. The method of claim 5,
   wherein the resource host is one of a plurality of resource hosts implemented as part of the distributed system; and
   wherein identifying the deployment state for the resource host comprises obtaining state information from one or more other ones of the plurality of resource hosts, wherein the state information comprises a last valid deployment state received from the remote deployment state authority for the resource host.

10. The method of claim 5, wherein identifying the deployment state for the resource host comprises receiving a request to deploy the resource host according to a particular deployment state.

11. The method of claim 5, further comprising:
wherein during the performance of the one or more operations to deploy resource host, determining that the remote deployment state authority for the resource host is available; and
in response to determining that the remote deployment state authority for the resource host is available, performing one or more other operations to
synchronize deployment of the resource host according to another deployment state received from the remote deployment state authority.

12. The method of claim 5,
wherein the deployment state identified for the resource host is identified for at least one resource deployed at the resource host, wherein the performing of the one or more operations includes deploying the at least one resource according to the identified deployment state;
wherein the identifying is performed to identify a different deployment state for at least one other resource deployed at the resource host, and wherein the performing is performed to deploy the one or more other resources according to the different deployment state.

13. The method of claim 5, wherein the distributed system is implemented as part of a provider network, and wherein the resource host is one of a plurality of resource hosts of the distributed system that implement one or more network-based services offered via the provider network.

14. A non-transitory, computer-readable storage medium, storing program instructions that when executed by one or more computing devices cause the one or more computing devices to implement:
upon startup of a resource host of a distributed system:
determining that a remote deployment state authority for the resource host is unavailable, wherein the remote deployment state authority provides current deployment state for resource hosts deployed in the distributed system;
identifying a deployment state for the resource host comprising accessing persistently maintained state information at the resource host comprising a last valid deployment state received from the remote deployment state authority for the resource host;
performing, at the resource host, one or more operations to configure the resource host to deploy the resource host according to the identified deployment state.

15. The non-transitory, computer-readable storage medium of claim 14, wherein, in accessing persistently maintained state information, the program instructions when executed by the one or more computing devices cause the one or more computing devices to further implement:
obtaining the persistently maintained state information from a storage device locally attached to the resource host.

16. The non-transitory, computer-readable storage medium of claim 14, wherein the program instructions when executed by the one or more computing devices cause the one or more computing devices to further implement:
requesting the current deployment state for the resource host deployed at the resource from the resource deployment state authority; and
updating the state information to include the current deployment state received from the resource deployment state authority.

17. The method of claim 16, wherein the program instructions when executed by the one or more computing devices cause the one or more computing devices to further implement publishing a metric indicating a time since last state information update.

18. The non-transitory, computer-readable storage medium of claim 14,
wherein the resource host is one of a plurality of resource hosts implemented as part of the distributed system; and
wherein, in identifying the deployment state for the resource host, the programming instructions cause the one or more computing devices to implement obtaining state information from one or more other ones of the plurality of resource hosts, wherein the state information comprises a last valid deployment state received from the remote deployment state authority for the resource host.

19. The non-transitory, computer-readable storage medium of claim 14, wherein the program instructions cause the one or more computing devices to further implement:
wherein during the performance of the one or more operations to deploy the resource host, determining that the remote deployment state authority for the resource host is available; and
in response to determining that the remote deployment state authority for the resource host is available, performing one or more other operations to synchronize deployment of the resource state according to another deployment state received from the remote deployment state authority.

20. The non-transitory, computer-readable storage medium of claim 19, wherein, in performing the one or more other operations to synchronize the deployment of the resource host, the programming instructions cause the one or more computing devices to implement undoing an effect of at least one of the one or more operations.

* * * * *